United States Patent [19]
Thompson

[11] Patent Number: 5,848,766
[45] Date of Patent: Dec. 15, 1998

[54] INTEGRATED CARGO CARRIER FOR SPACE APPLICATIONS

[75] Inventor: Clark Thompson, Webster, Tex.

[73] Assignee: Spacehab, Inc., Vienna, Va.

[21] Appl. No.: 666,730

[22] Filed: Jun. 18, 1996

[51] Int. Cl.[6] .................................................. B64G 1/22
[52] U.S. Cl. ......................................................... 244/158 R
[58] Field of Search ............................ 244/118.1, 158 R

[56] References Cited

U.S. PATENT DOCUMENTS

| | | | |
|---|---|---|---|
| 4,395,004 | 7/1983 | Gannssle et al. | 244/158 R |
| 4,600,169 | 7/1986 | Koster et al. | 244/158 R |
| 4,834,325 | 5/1989 | Faget | 244/158 R |
| 4,903,919 | 2/1990 | Johnson et al. | 244/159 |
| 5,441,221 | 8/1995 | Wade et al. | 244/159 |

*Primary Examiner*—Galen L. Barefoot
*Attorney, Agent, or Firm*—Rossi & Associates

[57] ABSTRACT

The present invention provides an integrated cargo carrier assembly that is compatible with the NSTS Orbiter and space stations located, in Earth orbit. The integrated cargo carrier assembly is capable of carrying various cargo panels on a pallet assembly and includes a pressurized tunnel that provides a translation path for crew members between the crew compartment of the NSTS Orbiter and a pressurized module located in the cargo bay. In addition, the pressurized tunnel can be utilized to carry payloads required to be maintained in a pressurized environment. The combination of the cargo carrying and connectivity features of the integrated cargo carrier assembly eases manifesting and on-orbit operations and greatly reduces the effort required to ground process various cargo. Further, the integrated cargo carrier assembly also eliminates difficulties in mating and de-mating payload to the NSTS Orbiter by providing integral latching means that permits payloads to be easily removed from the carrier on-orbit.

17 Claims, 4 Drawing Sheets

INTEGRATED CARGO CARRIER FOR SPACE APPLICATIONS

FIELD OF THE INVENTION

The present invention relates in general to modules that are capable of being positioned in space transportation vehicles, such as the National Space Transportation System (NSTS) Orbiter, for the purpose of carrying various payloads. More specifically, the invention relates to a detachable integrated cargo carrier assembly that is capable of carrying payloads while simultaneously providing a pressurized space for crew movement from the space vehicle to other pressurized modules.

BACKGROUND OF THE INVENTION

Previous modules available for transport to Earth orbit aboard the NSTS Orbiter include the SPACEHAB module developed by SPACEHAB Inc. The SPACEHAB module, as described in U.S. Pat. No. 4,867,395, the contents of which are incorporated herein by reference, includes flat end caps and a flat top panel that permit useful payload items to be attached to the outside of the module in addition to being carried within the module. The SPACEHAB module can be readily co-manifested with other payloads within the cargo bay of the NSTS Orbiter. In some situations, due to vehicle load and stress conditions, it may become necessary to locate the SPACEHAB module and similar pressurized module configurations toward the rear of the cargo bay of the NSTS Orbiter, and to couple the pressurized module configurations to the crew compartment of the NSTS Orbiter through an extended pressurized access tunnel. The use of extended pressurized access tunnel in the cargo bay between a pressurized module and the crew compartment, however, wastes valuable cargo carrying capacity, as conventional tunnels leaves no room to attach cargo payloads to the cargo bay in the normal manner.

In view of the above, it is an object of the invention to provide an integrated cargo carrier assembly that is capable of carrying payloads while simultaneously providing a pressurized space for crew movement from the space vehicle to other pressurized modules.

SUMMARY OF THE INVENTION

The present invention provides an integrated cargo carrier assembly that is compatible with the NSTS Orbiter and space stations located in Earth orbit. The integrated cargo carrier assembly is capable of carrying various cargo panels on a pallet assembly and includes a pressurized tunnel that provides a translation path for crew members between the crew compartment of the NSTS Orbiter and a pressurized module located in the cargo bay. In addition, the pressurized tunnel can be utilized to carry payloads required to be maintained in a pressurized environment. The combination of the cargo carrying and connectivity features of the integrated cargo carrier assembly eases manifesting and on-orbit operations and greatly reduces the effort required to ground process various cargo. Further, the integrated cargo carrier assembly also eliminates difficulties in mating and de-mating payload to the NSTS Orbiter by providing integral latching means that permits payloads to be easily removed from the carrier on-orbit.

More specifically, the integrated cargo carrier assembly includes a pallet assembly and a tunnel assembly. The pallet assembly includes a rectangular grid of structural members, cargo attachment panels, carrier attachment means and a standard grapple fixture. While on-orbit, the pallet assembly is capable of being remotely removed and replaced onto the tunnel assembly by the remote manipulator system of the NSTS Orbiter. The pallet assembly is also compatible with unpressurized carrier attachment points on manned orbiting space stations and may therefore be attached to such space stations with relative ease. The pallet assembly may then remain on orbit while the tunnel assembly is returned to Earth. A plurality of interchangeable cargo or payload panels may be attached to the rectangular grid of the pallet assembly. The cargo panels provide both cargo attachment means and additional structural integrity to the rectangular grid of the pallet assembly. Each interchangeable cargo panel is also remotely removable on-orbit. The panel assembly can be integrated with cargo panels separate from the tunnel assembly, thereby reducing pre-flight ground processing effort. Flexibility is enhanced by this feature, due to the ability to integrate cargo panels as they become available. Thus, last minute changes in manifests can be easily accommodated by changing panel assemblies.

The tunnel assembly includes a tunnel section and structural bulkheads. The tunnel assembly provides structural support for the pallet assembly and associated cargo in addition to providing pressurized access to pressurized modules loaded in the cargo bay of the NSTS Orbiter. In situations not requiring an access tunnel for crew passage, the tunnel section can be used for storing pressurized or unpressurized cargo internally and unpressurized cargo on attachment points located on the external surface of the tunnel section. The bulkheads of the tunnel assembly provide the structural interfaces between the integrated cargo carrier and the NSTS Orbiter via trunnion and keel pins. Once established, the interface between the tunnel assembly and the NSTS Orbiter remains static. Removal of the pallet assembly is accomplished by active attachment means located at the interface between the tunnel and pallet assemblies, which reduces operational requirements with respect to payload removal both on-orbit and during ground processing.

As previously mentioned, the tunnel assembly may be returned to Earth with the pallet assembly removed. Structural integrity is maintained by the tunnel assembly. Further, the tunnel assembly may be integrated with the NSTS Orbiter without a pallet assembly for certain applications, thereby enhancing manifesting and ground processing flexibility. In addition, multiple configurations are available for the integrated cargo carrier assembly, as will be described in greater detail below.

BRIEF DESCRIPTION OF THE DRAWINGS

The invention will be described with reference to the accompanying drawings, wherein.

DETAILED DESCRIPTION OF THE PREFERRED EMBODIMENTS

Figure 1:
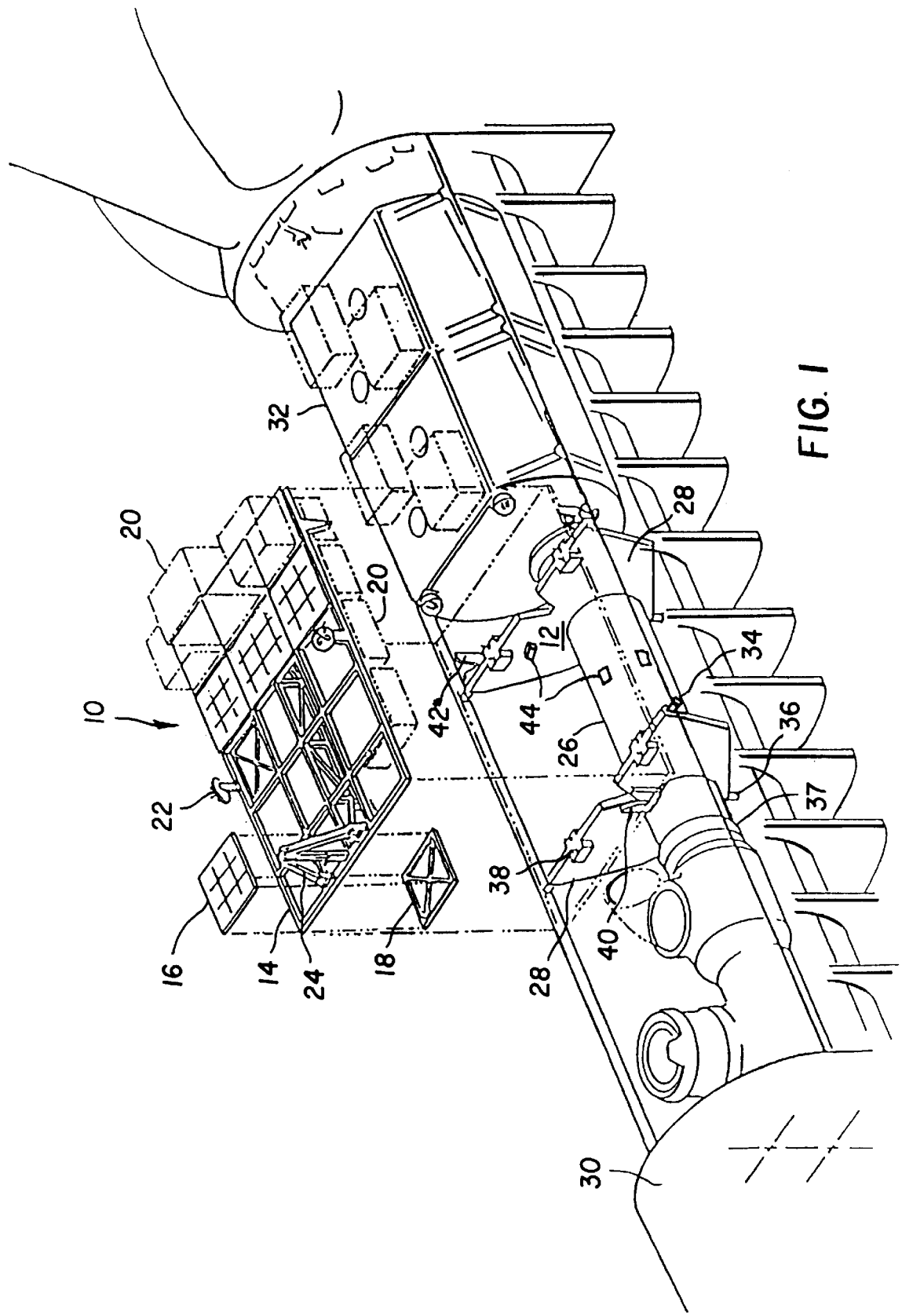
Fig. 1 illustrates an integrated cargo carrier assembly in accordance with the invention located in the cargo bay of an NSTS Orbiter with the pallet assembly detached from the tunnel assembly.

Referring now to FIG. 1, an integrated cargo carrier assembly is illustrated in the cargo bay of an NSTS Orbiter with a removable pallet assembly 10 separated from a tunnel assembly 12. The pallet assembly 10 includes a rectangular grid 14 (although other grid configurations can be utilized) of structural members to which upper and lower cargo or payload attachment panels 16, 18 are removable coupled through a releasable mechanism or mechanical fastener. The use of both upper and lower payload attachment panels 16, 18 allows various payloads 20 to be carried both above and below the rectangular grid 14. At least one standard grapple fixture 22 and one capture latch assembly 24 are also provided on the rectangular grid 14 of the pallet assembly 10.

Figure 2:
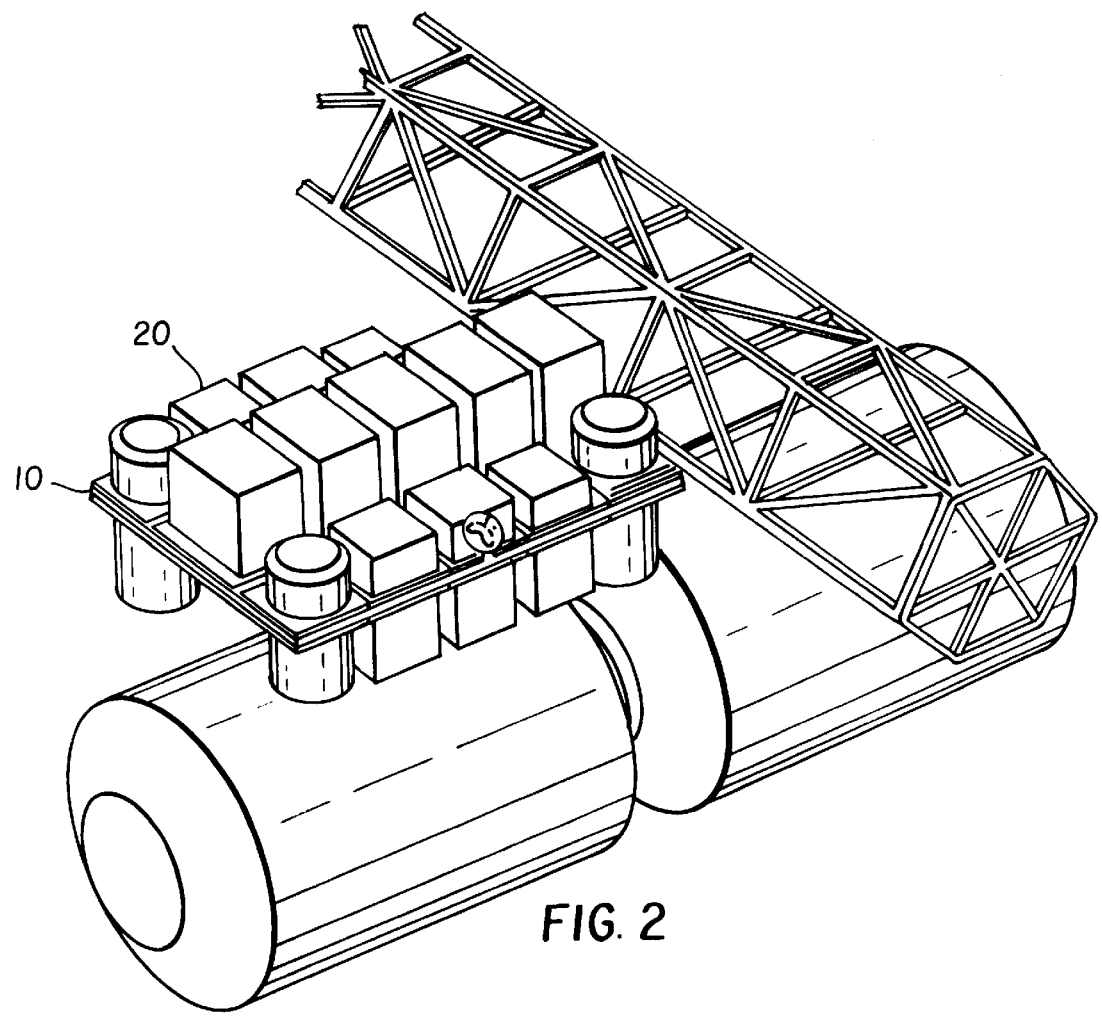
FIG. 2 illustrates the attachment of the pallet assembly to a truss of an orbiting space station.

While on-orbit, the pallet assembly 10 is capable of being remotely removed and replaced onto the tunnel assembly 12 by the remote manipulator system of the NSTS Orbiter using the grapple fixture 22. The pallet assembly 10 can then be left in orbit as a free floating payload satellite or attached to an orbiting platform or space station via the capture latch assembly 24 as illustrated in FIG. 2.

The upper and lower payload mounting panels 16, 18 can be adapted to carry a plurality of interchangeable cargo carrier containers, instrument packages, payload orbital replacement units and logistics items, some of which may include their own grapple fixture. When attached to the rectangular grid 14, the payload attachment panels 16, 18 provide additional structural integrity to the rectangular grid 14 of the pallet assembly 10. Each interchangeable payload attachment panel 16, 18 is also removable from the rectangular grid 14 either by remote controlled electrical latches or by manual releases that can be utilized by crew members during an extravehicular activity (EVA) on-orbit. Accordingly, some can be left in Earth orbit as individual instrument platforms, some can be delivered to other orbital facilities while previously delivered payload attachment panels are retrieved, or some can be returned to Earth without having been detached from the rectangular grid 14. A multitude of possibilities exist based on various mission requirements.

The pallet assembly 10 can be integrated with the payload attachment panels 16, 18 separate from the tunnel assembly 12, thereby reducing pre-flight ground processing effort. Accordingly, individual payloads can be integrated with their corresponding payload attachment panels 16, 18 and then mounted to the rectangular grid 14 as the payloads become available. Thus, last minute changes in manifests can be easily accommodated by changing individual payload attachment panels 16, 18 or, if necessary, the entire panel assembly 10 as a whole unit.

The tunnel assembly 12 includes a tunnel section 26 and structural bulkheads 28. The tunnel assembly 12 provides both structural support for the pallet assembly 10 and a pressurized access tunnel between the NSTS Orbiter 30 and a pressurized module 32 located in the cargo bay of the NSTS Orbiter 30. In situations not requiring an access tunnel for crew passage to a pressurized module, the tunnel section 26 can be used for storing pressurized or unpressurized cargo or payloads. The bulkheads 28 of the tunnel assembly 12 provide the structural interface between the integrated cargo carrier and the NSTS Orbiter 13 via trunnion pins 34 and keel pins 36. Once established, the interface between the tunnel assembly 12 and the NSTS Orbiter 30 remains static.

Figure 3:
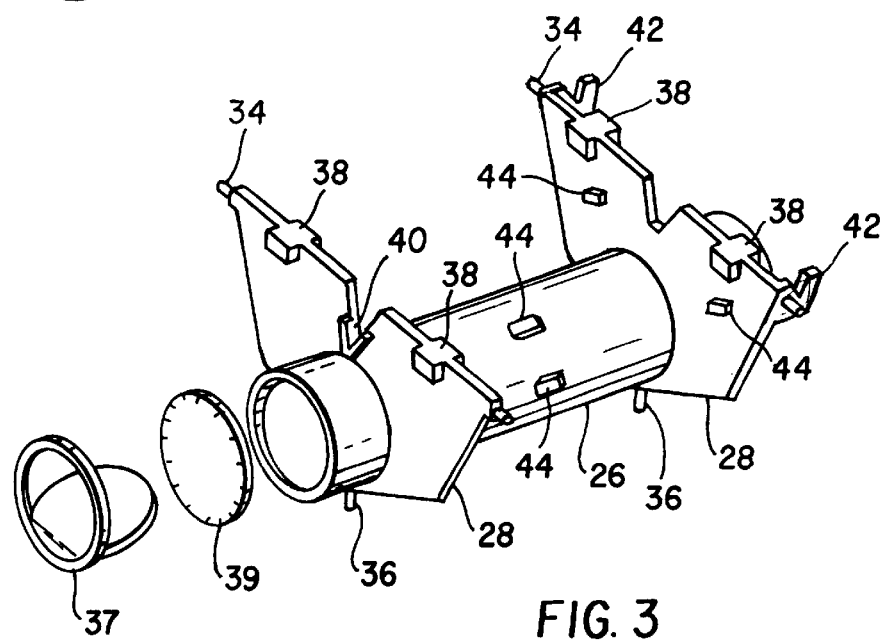
FIG. 3 illustrates the tunnel assembly detached from the pallet assembly.

Removal of the pallet assembly 10 from the tunnel assembly 12 is accomplished by a powered mating mechanism 38 (for example an electrically driven latch) located at the attachment point of the pallet assembly 10 to the tunnel assembly 12 as shown in FIG. 3. Accordingly, the pallet assembly 10 can be removed by remote means without requiring manual crew intervention. In the event of failure of the powered mating mechanism 38, however, it is preferable to also include a manual release mechanism that can be manipulated by the crew from the cargo bay during an EVA.

As illustrated in FIG. 3, the tunnel assembly 12 also includes removable hatched endcaps 37 for pressurized operation or solid endcaps 39 for unpressurized operation of the tunnel section 26. In a preferred embodiment, the tunnel section 26 can be extracted from the structural bulkheads 28 when the endcaps are removed, if the endcaps extend past the edge of the tunnel section 26, or with the endcaps in place, if the endcaps fit within the opening of the tunnel section 26. Accordingly, the structural bulkheads 28 of the tunnel assembly 12 can be utilized to support the pallet assembly 10 without the tunnel section 26 be present, thereby saving weight and space in applications where the tunnel section 26 is not required. Forward and aft alignment guides 40, 42 are also located on the bulkheads 28 to aid in aligning the pallet assembly 10 during a mating operation. Still further, the bulkheads 28 and/or tunnel section 26 are provided with standard attachment points 44, thereby permitting payloads to be directly attached to the external surface of the tunnel section 26 or to sides of the bulkheads 28.

Figure 4:
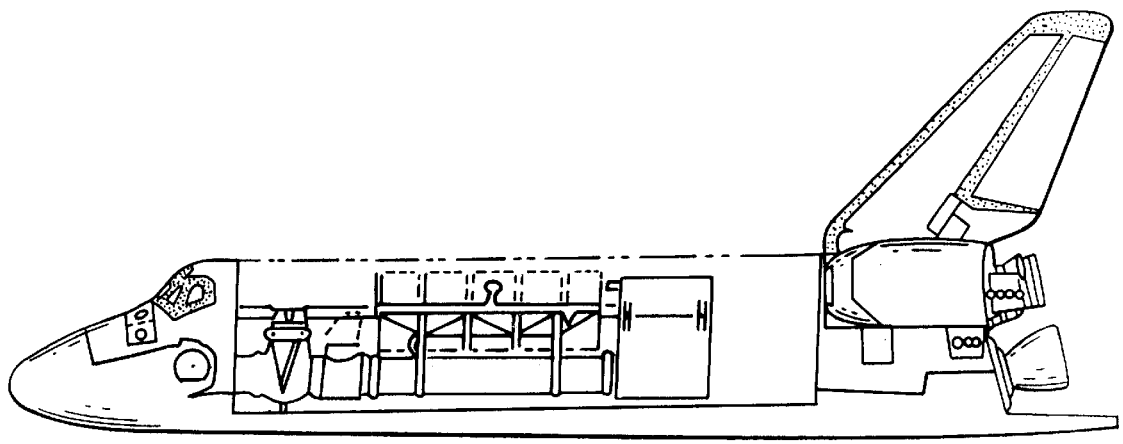
FIG. 4 illustrates the use of an integrated cargo carrier including a tunnel section coupled to a pressurized module in the cargo bay of an NSTS Orbiter.
Figure 5:
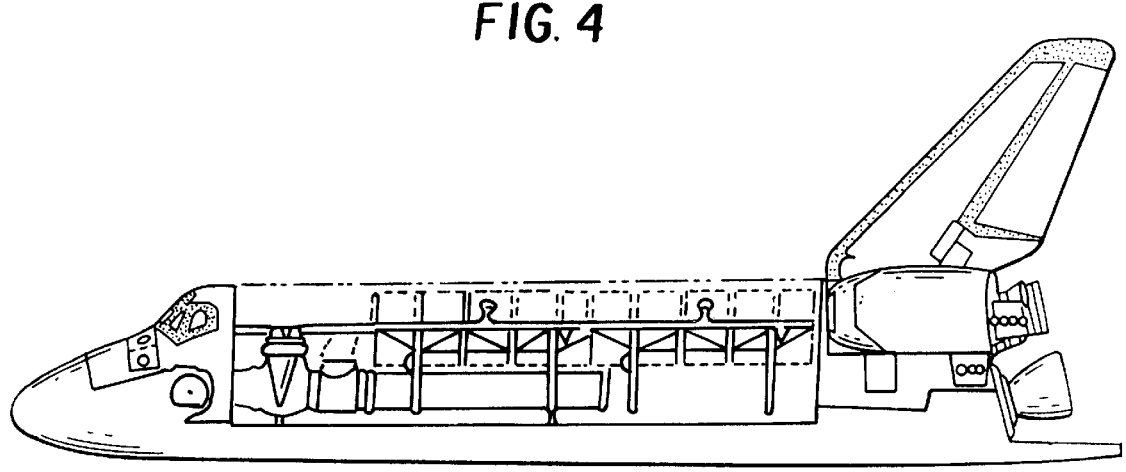
FIG. 5 illustrates the use of one integrate cargo carrier assembly with a tunnel section and one integrated cargo carrier assembly without a tunnel section in the cargo bay of an NSTS Orbiter.
Figure 6:
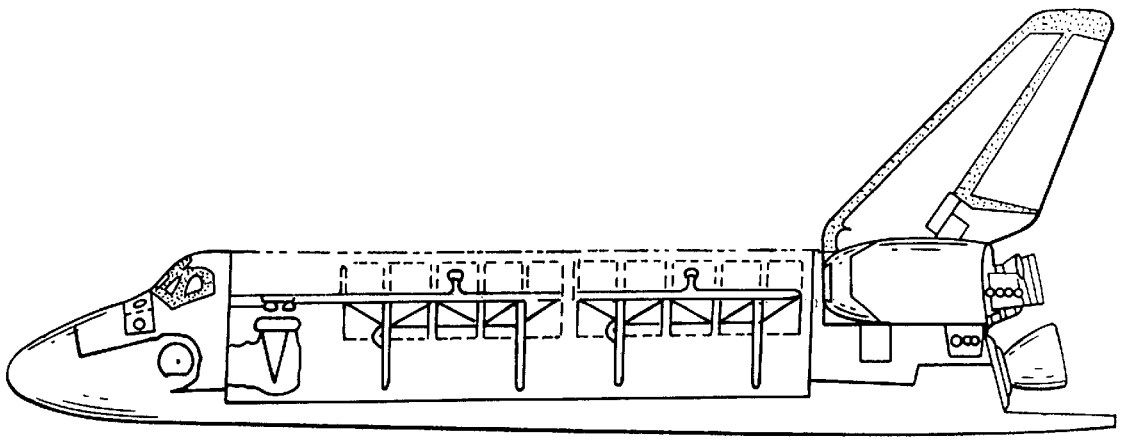
FIG. 6 illustrates the use of two integrated cargo carrier assemblies without tunnel sections in the cargo bay of an NSTS Orbiter.
Figure 7:
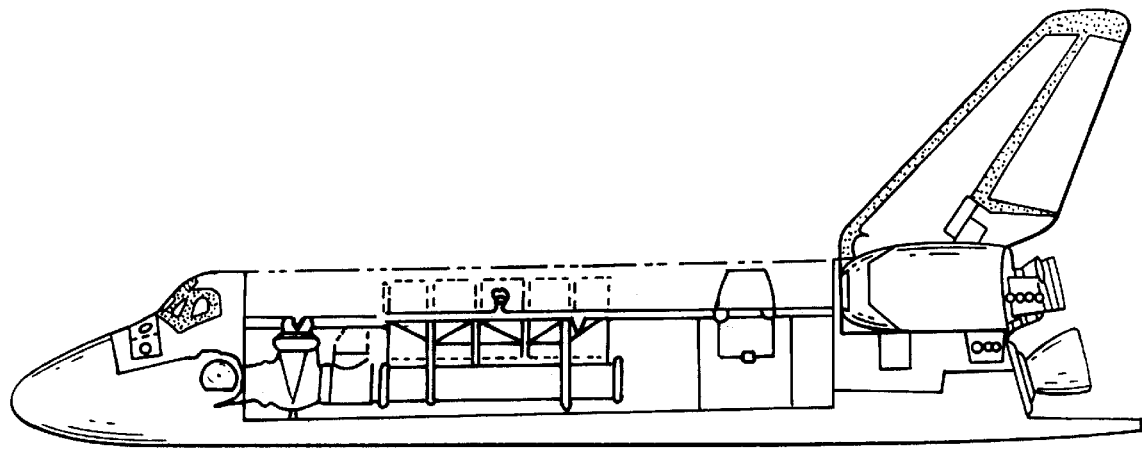
FIG. 7 illustrates the use of an integrated cargo carrier assembly with a tunnel section with another payload in the cargo bay of an NSTS Orbiter.
Figure 8:
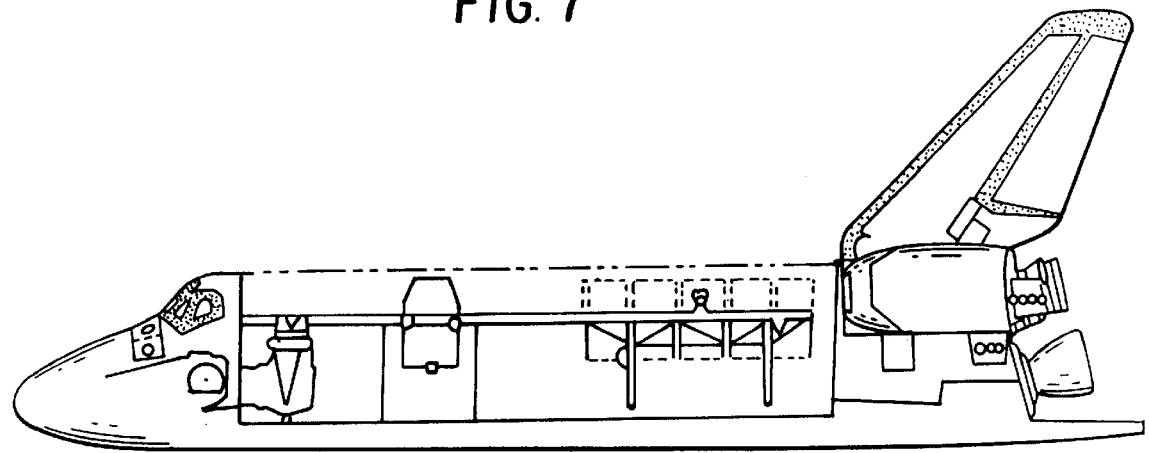
FIG. 8 illustrates the use of an integrated cargo carrier assembly without a tunnel section with another payload in the cargo bay.

The flexibility provided by the integrated cargo carrier assembly permits a number of different flight configurations. For example, FIG. 4 illustrates the use of an integrated cargo carrier including a tunnel section coupled to a pressurized SPACEHAB module; FIG. 5 illustrates the use of one integrate cargo carrier assembly with a tunnel section and one integrated cargo carrier assembly without a tunnel section in the cargo bay of the NSTS Orbiter; FIG. 6 illustrates the use of two integrated cargo carrier assemblies without tunnel sections; FIG. 7 illustrates the use of an integrated cargo carrier assembly with a tunnel section with another payload in the cargo bay; and FIG. 8 illustrates the use of an integrated cargo carrier assembly without a tunnel section with another payload in the cargo bay.

The invention has been described with reference to certain preferred embodiments thereof. It will be understood, however, that modifications and variations are possible within the scope of the appended claims.

What is claimed is:

1. An integrated cargo carrier assembly comprising:

a pallet assembly;

a tunnel assembly including means for securing the tunnel assembly within a cargo bay of a space vehicle; and fastening means for coupling the pallet assembly to the tunnel assembly such that said pallet assembly can be attached and detached from the tunnel assembly;

wherein the tunnel assembly supports the pallet assembly when the pallet assembly is attached to the tunnel assembly and the tunnel assembly is secured in the cargo bay; and wherein the pallet assembly extends across substantially an entire length of the tunnel assembly.

2. An integrated cargo carrier assembly as claimed in claim 1, wherein said pallet assembly includes a grid including a plurality of structural members.

3. An integrated cargo carrier assembly as claimed in claim 2, wherein said pallet assembly further includes a plurality of payload panels releasable coupled to the grid.

4. An integrated cargo carrier assembly as claimed in claim 3, wherein said plurality of payload panels include upper payload panels and lower payload panels.

5. An integrated cargo carrier assembly as claimed in claim 1, wherein said pallet assembly includes at least one of a grapple fixture and a capture latch assembly.

6. An integrated cargo carrier assembly as claimed in claim 1, wherein said means for securing the tunnel assembly includes at least one bulkhead including trunnion pins and a keel pin.

7. An integrated cargo carrier assembly as claimed in claim 6, wherein the fastening means includes power driven latches located on the bulkhead.

8. An integrated cargo carrier assembly as claimed in claim 6, wherein said tunnel assembly further comprises a tunnel section that passes through the bulkhead.

9. An integrated cargo carrier assembly as claimed in claim 6, wherein said tunnel assembly further comprises endcaps releasably coupled to the tunnel section.

10. An integrated cargo carrier assembly as claimed in claim 9, wherein said endcaps include a pressurized hatch.

11. An integrated cargo carrier assembly as claimed in claim 6, wherein the bulkhead includes at least one attachment point.

12. An integrated cargo carrier assembly as claimed in claim 6, wherein the tunnel section includes at least one attachment point located on an outside surface of the tunnel section.

13. An integrated cargo carrier assembly comprising:

a first bulkhead; a second bulkhead; and a tunnel section extending between said first bulkhead and said second bulkhead;

wherein said first bulkhead and said second bulkhead include locating means for locating said first bulkhead and said second bulkhead within a cargo bay of an orbiter vehicle; and wherein at least one of said first bulkhead and said second bulkhead includes means for coupling and decoupling a payload pallet to said first and second bulkheads such that said payload pallet extends from said first bulkhead to said second bulkhead.

14. An integrated cargo carrier as claimed in claim 13, wherein the locating means includes a trunnion pins and keel pins.

15. An integrated cargo carrier as claimed in claim 13, wherein the tunnel section includes first and second endcaps.

16. An integrated cargo carrier as claimed in claim 15, wherein at least one of said first and second endcaps is removable.

17. An integrated cargo carrier as claimed in claim 16, wherein at least one of said first and second endcaps comprises a pressurized hatch.

* * * * *